US008729842B2

(12) United States Patent
Babcock et al.

(10) Patent No.: US 8,729,842 B2
(45) Date of Patent: May 20, 2014

(54) SUPPLY ARCHITECTURE FOR INDUCTIVE LOADS

(75) Inventors: Paul M. Babcock, Spokane Valley, WA (US); David J. Babcock, Spokane Valley, WA (US); Phillip N. Smith, Liberty Lake, WA (US)

(73) Assignee: Flyback Energy, Inc., Spokane Valley, WA (US)

( * ) Notice: Subject to any disclaimer, the term of this patent is extended or adjusted under 35 U.S.C. 154(b) by 300 days.

(21) Appl. No.: 13/012,788

(22) Filed: Jan. 24, 2011

(65) Prior Publication Data

US 2011/0115462 A1    May 19, 2011

Related U.S. Application Data

(60) Continuation of application No. 12/554,546, filed on Sep. 4, 2009, now Pat. No. 7,898,229, which is a division of application No. 11/582,115, filed on Oct. 16, 2006, now Pat. No. 7,602,157.

(60) Provisional application No. 60/754,460, filed on Dec. 28, 2005.

(51) Int. Cl.
*H02H 7/08* (2006.01)

(52) U.S. Cl.
USPC ............ 318/400.21; 318/400.01; 318/400.22

(58) Field of Classification Search
USPC .......... 318/400.01, 400.21, 400.22, 434, 821, 318/825; 323/222
See application file for complete search history.

(56) References Cited

U.S. PATENT DOCUMENTS

| 448,326 A | 3/1891 | Eickemeyer |
| 3,581,117 A | 5/1971 | Dixon, Jr. |
| 3,614,474 A | 10/1971 | Hahn |
| 4,055,789 A | 10/1977 | Lasater |
| 4,160,920 A | 7/1979 | Courier de Mere |

(Continued)

FOREIGN PATENT DOCUMENTS

| DE | 3425414 | 7/1984 |
| EP | 0151199 | 2/1984 |
| EP | 0319660 | 6/1989 |
| EP | 0902527 | 3/1999 |
| FR | 2611098 | 2/1987 |

(Continued)

OTHER PUBLICATIONS

He, "An Improved Energy Recovery Soft-Switching Turn-on/Turn-off Passive Boost Snubber with Peak Voltage Clamp," APEC 2000, Fifteenth Annual IEEE, vol. 2, pp. 699-706.

(Continued)

*Primary Examiner* — Karen Masih
(74) *Attorney, Agent, or Firm* — Craige Thompson; Thompson Patent Law Offices

(57) ABSTRACT

Apparatus and associated systems and methods may relate to a process for supplying unidirectional current to a load, controlling a reverse electromotive force (REMF), capturing inductive energy from the load, and supplying the captured inductive energy to the load. In an illustrative example, an operating cycle may include a sequence of operations. First, inductive energy captured from the load on a previous cycle may be supplied to the load. Second, energy may be supplied to the load from an external power source. Third, a REMF voltage may be substantially controlled upon disconnecting the power source from the load. Fourth, the load current may be brought to zero by capturing the inductive energy for use on a subsequent cycle. In some embodiments, a single power stage may supply a DC inductive load, or a pair of power stages may be operated to supply bidirectional current to an AC load.

13 Claims, 8 Drawing Sheets

(56) References Cited

U.S. PATENT DOCUMENTS

| | | | |
|---|---|---|---|
| 4,330,742 A | 5/1982 | Reimers | |
| 4,356,440 A | 10/1982 | Curtiss et al. | |
| 4,549,121 A | 10/1985 | Gale | |
| 4,565,938 A | 1/1986 | Fawzy | |
| 4,581,543 A | 4/1986 | Herberg | |
| 4,651,066 A | 3/1987 | Gritter et al. | |
| 4,661,747 A | 4/1987 | Gray, Sr. | |
| 4,663,547 A | 5/1987 | Baliga et al. | |
| 4,724,368 A | 2/1988 | Andrews | |
| 4,763,053 A | 8/1988 | Rabe | |
| 4,768,075 A | 8/1988 | Broich et al. | |
| 4,816,891 A | 3/1989 | Nishizawa | |
| 4,937,726 A | 6/1990 | Reustle | |
| 4,947,071 A | 8/1990 | Clarke | |
| 4,965,864 A | 10/1990 | Roth et al. | |
| 5,003,241 A | 3/1991 | Rowan et al. | |
| 5,047,913 A | 9/1991 | De Doncker et al. | |
| 5,283,726 A | 2/1994 | Wilkerson | |
| 5,329,195 A | 7/1994 | Horber et al. | |
| 5,334,898 A | 8/1994 | Skybyk | |
| 5,449,989 A | 9/1995 | Correa et al. | |
| 5,554,903 A | 9/1996 | Takara | |
| 5,568,368 A | 10/1996 | Steigerwald et al. | |
| 5,682,086 A | 10/1997 | Moo et al. | |
| 5,717,562 A | 2/1998 | Antone et al. | |
| 5,773,908 A | 6/1998 | Stephens et al. | |
| 6,084,325 A * | 7/2000 | Hsu | 310/74 |
| 6,166,500 A | 12/2000 | Makaran | |
| 6,175,484 B1 | 1/2001 | Caruthers et al. | |
| 6,266,257 B1 | 7/2001 | Geissler | |
| RE37,576 E | 3/2002 | Stephens et al. | |
| 6,380,707 B1 | 4/2002 | Rosholm et al. | |
| 6,384,553 B1 | 5/2002 | Liu | |
| 6,389,169 B1 | 5/2002 | Stark et al. | |
| 6,392,370 B1 | 5/2002 | Bedini | |
| 6,717,827 B2 | 4/2004 | Ota | |
| 7,126,833 B2 | 10/2006 | Peng | |
| 7,336,512 B2 | 2/2008 | Geissler | |
| 7,427,841 B2 | 9/2008 | Hamaoka et al. | |
| 7,778,056 B2 | 8/2010 | Geissler | |
| 8,593,096 B1 * | 11/2013 | Hong et al. | 318/400.34 |
| 2001/0017493 A1 | 8/2001 | Sakamoto | |
| 2002/0097013 A1 | 7/2002 | Bedini | |
| 2003/0025408 A1 | 2/2003 | Miekka et al. | |
| 2003/0086619 A1 | 5/2003 | Nagaishi | |
| 2003/0099561 A1 | 5/2003 | Heydt et al. | |
| 2004/0061397 A1 | 4/2004 | Rose | |
| 2005/0163344 A1 | 7/2005 | Kayahara et al. | |
| 2005/0234323 A1 | 10/2005 | Kayahara et al. | |
| 2006/0012259 A1 | 1/2006 | Kerlin | |
| 2006/0061224 A1 | 3/2006 | Mullin et al. | |
| 2006/0219513 A1 | 10/2006 | Organek | |
| 2007/0146958 A1 | 6/2007 | Babcock et al. | |
| 2008/0197819 A1 | 8/2008 | Thompson et al. | |
| 2009/0073726 A1 | 3/2009 | Babcock | |
| 2009/0195199 A1 | 8/2009 | Ito | |
| 2010/0007223 A1 | 1/2010 | Denne | |
| 2010/0213885 A1 | 8/2010 | Ichiyama | |

FOREIGN PATENT DOCUMENTS

| | | |
|---|---|---|
| JP | 60-107917 | 6/1985 |
| JP | 07/322634 | 8/1995 |
| JP | 9084352 | 3/1997 |
| JP | 10066203 | 3/1998 |
| JP | 10/066203 | 6/1998 |
| KR | 1029970078524 | 8/2007 |
| WO | WO95/31853 | 11/1995 |
| WO | WO9531853 | 11/1995 |
| WO | WO99-38247 | 7/1999 |

OTHER PUBLICATIONS

Grossner, Nathan, "Transformers for Electronic Circuits," Feb. 1983, 2nd Ed. McGraw-Hill, pp. 132-173.

"Beware of Zero-Crossover Switching of Transformers," Tyco Electronics Corporation—P&B, Application Note, pp. 1-2. (Believed to have been published before Jan. 1, 2001).

International Search Report and Written Opinion in PCT/US2008/076895 May 13, 2009, 7 pages.

"Active-Clamp Snubbers for Isolated Half-Bridge DC-DC Converters." Hong Mao et al.; IEEE Transactions on Power Electronics pp. 1294-1302, vol. 20, No. 6, Nov. 2005.

"A Novel Energy Recycling Clamp Circuit," Ten Liu, et al., IEEE Transactions, pp. 1205-1209, 2005.

"A simple Energy Recovery Circuit for High-Power Inverters with Complete Turn-on and turn-off Snubbers," Xiangning He, IEEE Transactions on Industrial Electronics 7 pgs. V5.

"New Snubbers with Energy Recovery into a Local Power Supply" Gregory Ivensky, et al., IEEE Transactions, pp. 1327-1332, 2003.

"Passive Snubber Energy Recovery for a GTO Thyristor Inverter Bridge Leg," Barry Williams, IEEE Transactions on Industrial Electronics, pp. 2-8, V47, No. 1, Feb. 2000.

"Novel Three-Phase SMR Converter with Inherent Snubber Energy Recovery Capability", Yashuir Okuma, IEEE Transactions on Industry Applications, pp. 326-334, V32, No. 2 Mar. 1996.

"A Low-Loss Full-Bridge PWM DC-DC Converter Topology," Vassilios G. Agelidis, et al., IEEE Transactions, pp. 531-537, 1993.

"Soft Switching Active Snubbers for DC/DC Converters," Ahmed Elasser, IEEE Transactions 1996, pp. 483-489.

A High Switching Frequency IGBT PWM Rectifier/Inverter System for AC Motor Drives Operating from Single Phase Supply, K. Thiyagarajah, IEEE Transactions, pp. 576-584, V6 No. 4.

"Recovery Circuit for Snubber Energy in Power Electronic Applications with High Switching Frequencies." Johan C. Bendien, IEEE Transactions, pp. 26-30, V3, No. 1 Jan. 1988.

"Active Clamp Resets Transformer in Converters," Bob Bell, Power Electronics Technology, pp. 26-32, Jan. 2004.

International Preliminary Report on Patentability in PCT/US2006/062664, mailed Jul. 10, 2008, 8 pages.

International Search Report and Written Opinion in PCT/US2006/062664, mailed May 31, 2007, 13 pages.

International Search Report and Written Opinion in PCT/US2010/062278, Apr. 27, 2011, 9 pages.

European Office Action of Application No. EP06851335.7, dated Dec. 7, 2010, 3 pages.

Response to EP Office Action of application No. EP06851335.7, dated Aug. 5, 2010, 2 pages.

European Patent Office Action of Application No. 06851335.7, dated Apr. 16, 2010, 5 pages.

"The Power Transformer Syntheses" Chapter 5, pp. 132-173, believed to be published before Dec. 1, 2004.

U.S. Appl. No. 60/973,224, applicant Paul M. Babcock, filed Sep. 18, 2007.

Bongwon Suh et al., "Automatic Thumbnail Cropping and its Effectiveness" UIST 03 Proceedings ACM Symposium on User Interface Software & Technology, Nov. 2-5 2003.

Patent Abstract of Japan, vol. 2003, No. 12, Dec. 5, 2003 & JP 2004/28059.

Patent Abstract of Japan, vol. 2003, No. 12, Dec. 5, 2003 & JP 2005050051.

International Search Report and Written Opinion in PCT/US2010/062273, Apr. 6, 2011, 11 pages.

International Search Report from EP application No. 12162382.1-2207 dated Aug. 28, 2012, 8 pages.

Japanese Office Action from Japanese application No. 2008-548848, dated Apr. 25, 2012, 6 pages.

Chinese Office Action from CN appl. No. 200801116304.7 dated Aug. 22, 2012, 6 pages.

First Patent Examination Report, Australian Patent Application No. 2008302264, 3 pages, dated Sep. 4, 2012.

Japanese Foreign Office Action, Application No. 2010-525978, Received Aug. 30, 2013, 4 pages.

* cited by examiner

SUPPLY ARCHITECTURE FOR INDUCTIVE LOADS

CROSS-REFERENCE TO RELATED APPLICATIONS

This application claims priority under 35 USC §119 to U.S. Patent Application Ser. No. 60/754,460, entitled, "Apparatus and Method for Improving Electromagnetic Processes by Capturing, Controlling and Utilizing Reverse EMF Energy," which was filed on Dec. 28, 2005 by Babcock et al. This application also claims priority as a divisional application filed under 35 USC §121 to U.S. Pat. No. 7,602,157, entitled "Supply Architecture for Inductive Loads," which was filed on Oct. 16, 2006 by Babcock, et al., and claims priority as a continuation application filed under 35 USC §120 to U.S. patent application Ser. No. 12/554,546, of the same title and inventorship, which was filed on Sep. 4, 2009 by Babcock, et al. The contents of each of the foregoing priority documents are fully incorporated herein by reference.

TECHNICAL FIELD

Various embodiments relate to operating inductive and/or resistive loads.

BACKGROUND

Many electrically-operated systems and devices have inductance. Some inductive devices, such as DC (direct current) motors, automotive ignition systems, and some electromagnets, can operate when supplied with a unidirectional current. Some inductive devices, such as transformers, AC (alternating current) motors, and fluorescent lights, operate when supplied with a bidirectional current.

In general, inductive elements can store energy in a magnetic field. Typically, the magnetic field is supported by an electric current flowing through the inductive element. Inductance may be a function of the characteristics of a magnetic flux path. For example, inductance in some elements may depend on material properties of a core (e.g., air, steel, and ferrite) in the flux path, and/or a flux density saturation level.

The amount of energy stored in a magnetic field of an inductive element can be a function of the inductance and the current. In general, the amount of energy stored in the magnetic field increases as current increases, and decreases as the current decreases. Accordingly, when the current through the inductive element is zero, the stored inductive energy is also zero.

One characteristic of an ideal inductor is that a voltage across the inductor is proportional to its inductance and the time rate of change of current. This concept may be represented by a formula as: $V = L \, di/dt$.

Under certain conditions, the energy stored in an inductor can generate potentially uncontrolled large voltages. This effect may be referred to by terms such as reverse electromotive force (REMF), flyback voltage, or "inductive kick." As an illustrative example, if an inductor is being supplied a current through a switch, and that switch is rapidly opened, then the inductor may have a relatively large change of current (large di) in a relatively short period of time (small dt). As a consequence, the inductor could generate a correspondingly large voltage (large V).

In some applications, the energy stored in an inductor may be capable of generating sufficiently large voltages to damage or destroy, for example, an unprotected switch. In some systems, stored inductive energy may be dissipated as heat.

SUMMARY

Apparatus and associated systems and methods may relate to a process for supplying unidirectional current to a load, controlling a reverse electromotive force (REMF), capturing inductive energy from the load, and supplying the captured inductive energy to the load. In an illustrative example, an operating cycle may include a sequence of operations. First, inductive energy captured from the load on a previous cycle may be supplied to the load. Second, energy may be supplied to the load from an external power source. Third, a REMF voltage may be substantially controlled upon disconnecting the power source from the load. Fourth, the load current may be brought to zero by capturing the inductive energy for use on a subsequent cycle. In some embodiments, a single power stage may supply a DC inductive load, or a pair of power stages may be operated to supply bidirectional current to an AC load.

Certain embodiments may provide one or more advantages. For example, some embodiments may operate to maintain substantially unidirectional current flow during each operating state, which may substantially reduce and/or eliminate resonances and associated electromagnetic noise. For example, various embodiments may generate substantially reduced or negligible energy that may contribute to conducted and/or radiated electromagnetic interference (EMI). Some embodiments may operate from a wide range of AC and/or DC voltages and frequencies, and supply either unidirectional and/or bidirectional current to inductive and/or resistive loads. Energy recovery and re-use may provide high efficiency at low noise levels. In some AC input embodiments, control of phase and duty cycle may provide high input power factor and harmonic factor. Some embodiments may provide output power controllability, which may yield energy savings in applications such as fluorescent lighting, for example. Furthermore, some DC input embodiments may provide substantial input line stabilization with low input line noise while supplying AC or DC outputs to inductive and/or resistive loads. Various embodiments may be implemented in a wide range of form factors and/or integrated modules which may provide reduced manufacturing cost, increased reliability, and/or simplicity of use in a wide variety of stand-alone or system integration applications.

The details of various embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EXAMPLES

Figure 1:
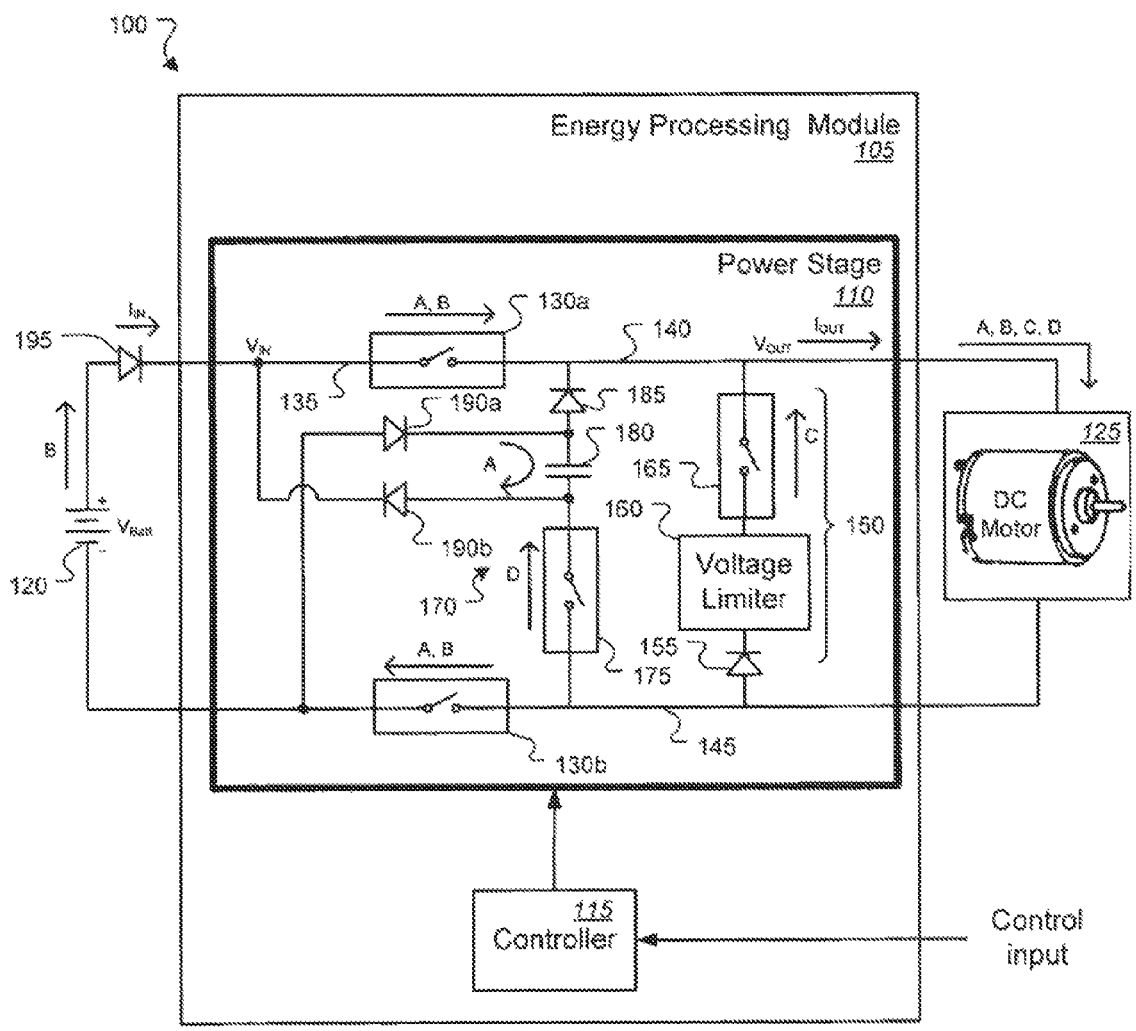
FIG. 1 shows a schematic representation of an exemplary energy processing module with a power stage to supply energy from a DC input to a DC inductive load.

FIG. 1 shows an exemplary system 100 in which energy may be supplied to inductive and/or resistive loads at a controllable rate with high efficiency and low electromagnetic noise. The system 100 of this example includes an energy processing module 105 that receives energy at an input, processes the energy, and delivers unidirectional current to supply energy to a load connected at an output. The module 105 includes a power stage 110 that operates in response to control signals from a controller 115. In operation, the controller 115 controls the operating states of switches in the power stage 110 according to a sequence of operating states that may, for example, be repeated in a cyclical pattern. In an exemplary cycle of operation, the controller 115 generates a sequence of operating states that cause the power stage 110 to store energy from a power source 120 into an inductive load 125, control a reverse electromotive force (REMF) that may develop when the inductive load 125 is disconnected from the source 120, discharge inductive energy from the load into a capacitance, and then discharge the capacitance to store energy back into the load 125 on a subsequent cycle. In various embodiments, the power stage 110 may deliver substantially unidirectional current flow to the load 125. Some embodiments may completely discharge stored inductive energy from the load 125 during each cycle.

One exemplary cycle of operation of the power stage 110 includes a sequence of operating states as indicated by arrows A, B, C, D. For example, the processing module 105 may draw current from the power source 120 during a state B of a cycle, while the power stage 110 may provide for unidirectional current flow through the load 125 (e.g., DC (direct current) motor) during states A, B, C, and D of the cycle. In some applications, additional work may be performed during states A, C, and D when no power is being drawn from the power source 120. Examples of voltage and current waveforms associated with some embodiments of the power stage 110 are described in further detail with reference to FIG. 3 and FIG. 8.

In the depicted example, the power stage 110 includes a pair of input switches 130a, 130b, which may be operated, in some embodiments, as a double-pole single throw switch. Some other embodiments (not shown) may be configured to operate with only one of the input switches 130a, 130b. The input switch 130a connects between an input node 135 and an output node 140. The voltages of the nodes 135, 140 may be referred to herein as Vin, Vout, respectively. After the input switches 130a, 130b are turned on, an input current (Iin) supplied from the power source 120 may flow to the input node 135, and through the input switch 130a to the output node 140. An output current (Iout) flows from the output node 140, through the load 125, and returns through a return node 145 and the input switch 130b to the power source 120. As will be described below, the current Iin from the power source 120 may begin to flow some time after the input switches 130a, 130b are turned on.

The power stage 110 further includes a transitional circuit 150 which may be operated to provide a current flow path for the current Iout so as to control an amplitude of a REMF that may be generated when the input switches 130a, 130b open and rapidly disconnect the output current Iout from the input current Iin. As such, the transitional circuit 150 may substantially protect the input switches 130a, 130b from exposure to potentially destructive REMF voltages. In the depicted example, the transitional circuit 150 includes a unidirectional current element (e.g., diode) 155 in series connection with a voltage limiter element 160 and a transitional switch 165. Exemplary embodiments of the transitional circuit 150 are described in further detail, for example, with reference to FIGS. 2 and 8-9.

The power stage 110 also includes an energy capture circuit 170 connected substantially in electrical parallel with the load 125 and the transitional circuit 150. In the depicted example, the energy capture circuit 170 includes an energy capture switch 175 in series connection with a capacitor 180 and a unidirectional current element (e.g., diode) 185. When the energy capture switch 175 is turned on, the output current Iout can flow from the return node 145 to the output node through the capacitor 180. Accordingly, inductive energy in the load 125 is transferred to stored charge on the capacitor 180. The rate at which output current Iout falls depends substantially on a capacitance value of the capacitor 180. As one skilled in the art will appreciate, increasing the capacitance value may result in a longer time for the Iout to "reset" to zero. In various embodiments, the capacitance value of the capacitor 180 may be selected or dynamically adjusted to reset the output current Iout to zero before the next operating cycle. After the output current Iout resets to zero, the unidirectional current element 185 substantially prevents Iout current from flowing in the opposite direction. As such, resonances or oscillatory currents may be substantially prevented with respect the output node 140 of the power stage 110.

Finally, the depicted power stage 110 includes diodes 190a, 190b to return captured energy from the capacitor 180 to the input node 135. During steady-state operation, for example, the capacitor 180 supplies the captured energy through the diodes 190a, 190b and back to the load 125 when the input switches 130a, 130b are turned on. In this example, a blocking diode 195 substantially prevents the captured energy from flowing back to the power source 120. This energy recovery may advantageously improve efficiency, for example, in applications in which substantial inductive energy can be recovered from the load and re-supplied to the load on a subsequent operating cycle.

In various applications, the controller 115 may generate one or more control signals to control the switches 130a, 130b, 165, and 175 during an exemplary cycle of operation. To aid understanding of an exemplary operation of the power stage 110, time period indicators A, B, C, D are shown on FIG. 1 to indicate current flows at successive time periods within a typical cycle of operation. Exemplary voltage and current waveforms during each of the indicated time periods are described in further detail with reference to FIG. 3.

In the example depicted in FIG. 1, an exemplary cycle of operation begins with a time period A. At the beginning of the time period A, the capacitor 180 may be charged with energy captured from a previous operating cycle. During the time period A, the input switches 130a, 130b are turned on, and the capacitor 180 may discharge its stored energy through the diodes 190a, 190b, the switches 130a, 130b, and the load 125. During the time period A, energy that is delivered to the load 125 is drawn substantially from the capacitor 180. The time period A may end, for example, when the capacitor 180 discharges to a point that the diode 195 is no longer reverse biased.

At the beginning of the time period B, the input switches 130a, 130b remain turned on, and the power source 120 drives current through the diode 195, the switches 130a, 130b, and the load 125. During the time period B, energy that is delivered to the load 125 is drawn substantially from the power source 120. The time period B may end, for example, when the on-time of the input switches 130, 130b corresponds to a duty cycle set by the controller 115, or when the output current Iout reaches a threshold value. At the end of the time period B, the controller 115 may command the input switches 130a, 130b to transition to an off (e.g., non-conducting) state.

Prior to the end of the period B, the controller 115 may generate a command to turn on the transitional switch 165 to minimize delay in allowing the output current Iout to flow through the transitional circuit 150. At the beginning of the time period C, the load generates the REMF voltage in response to the opening of the input switches 130a, 130b. The REMF voltage may forward bias the unidirectional current element 155, such that the output current Iout flows substantially through the transition circuit 150. The voltage limiter 160 may operate to substantially control (e.g., limit, clamp, or the like) the REMF voltage to a value that, for example, is substantially within the voltage ratings of any devices that could be exposed to the REMF voltage. During the time period C, some inductive energy may be transferred from the load 125 to the voltage limiter 160. In various embodiments, the time period C may be sufficiently short in duration that the amount of energy transferred to the voltage limiter is relatively small and can be, for example, dissipated as heat (e.g., in a resistor) without significantly reducing overall efficiency. In some embodiments, the controller 115 may generate a signal to turn on the energy capture switch 175 before or during the time period C. As the energy capture switch 175 turns on and becomes capable of conducting the output current Iout, the time period C may conclude, and the controller 115 may generate a signal to turn off the transitional switch 165.

At the beginning of the time period D, the output current Iout flows substantially through the energy capture switch 175, the capacitor 180, and the unidirectional current element 185. As such, stored inductive load energy, which is supported by the output current Iout, gets transferred to the capacitor 180 during the time period D. The time period D may end, for example, after the output current Iout falls to zero. Upon detecting that the output current Iout has reset to zero, or after allowing a time sufficient to ensure the output current Iout is substantially reset, the controller 115 may generate a signal to turn off the energy capture switch 175.

Following the time period D, there may be, in some embodiments, an additional period of time from the end of the time period D until the end of the operating cycle. In some applications, for example, the voltage limiter 160 may be discharging a capacitor into a resistor or through a switch (not shown) during this additional time period. In various applications, a motor may be coasting, for example, during this period.

In various examples, the controller 115 may time the operation of some or all of the switches 130a, 130b, 165, and 175 during an exemplary operating cycle as follows. The transitional switch 165 may be turned on prior to turning off the input switches 130a, 130b. The diode 155 may substantially block current flow through the transitional circuit 150 until the output current Iout starts to decrease and a REMF voltage is generated by the load 125. The transitional circuit 165 may be turned on early enough to substantially minimize a delay time for the output current Iout to start flowing through the transitional circuit 150. The energy capture switch 175 may be turned on at any one of a number of times, which may be before, at the same time, or after the transitional switch 165 is turned on. As the energy capture switch 175 starts to conduct a substantial portion of the current Iout, the transitional switch 165 may be turned off.

In another embodiment (not shown), the power stage 110 may operate substantially without an actively controlled transition circuit, such as the transition circuit 150. In such embodiments, the energy capture switch 175 may be turned on while the input switches 130a, 130b are conducting the output current Iout. The unidirectional current element 185 may be reverse biased until the output current Iout starts to decrease, at which point the REMF voltage may forward bias the unidirectional current element 185 such that the output current Iout would start to flow through the energy capture circuit 170. In various examples, passive voltage clamping circuitry, examples of which are described with reference to FIGS. 2 and 8-9, could optionally be used to control a REMF voltage amplitude, for example, in the voltage limiter 160. In some embodiments, the transitional switch 165 may be turned on continuously during normal operation, or replaced with a short circuit, for example. In some embodiments, the transitional switch 165 may be turned on during part or all of the time periods A and/or B, for example.

When the input switches 130a, 130b open, inductance in the load 125 may generate a reverse electromotive force (REMF), which, in general, may be considered to represent a voltage with an amplitude that corresponds to the time rate of change of the load current (e.g., dIout/dt). Reducing Iout to zero very rapidly, for example, may generate a substantial REMF voltage in the inductive load 125.

Fast transient voltages associated with a large REMF could generate, for example, substantial radiated and/or conducted electromagnetic radiation (e.g., radio frequency noise). Generally, systems that generate such noise energy may employ shielding and/or filtering, which may reduce efficiency and increase the cost, volume and/or weight of the system.

Moreover, large REMF voltages may impart substantial voltage stress to components, such as switches, diodes, capacitors, and transistors. In some examples, a single pulse of a large REMF voltage can substantially damage or destroy a semiconductor device, for example, by exceeding the device's voltage rating.

The power stage 110 provides a capability for rapidly switching current supplied to an inductive load. In one aspect, the power stage 110 includes a transitional circuit 150 in parallel with the load 125. In some embodiments, the transitional circuit 150 may provide a path for the load current Iout to flow so that dIout/dt is controlled during a brief transition period after the input switch 130 opens. Controlling the dIout/dt for the inductive load 125 may substantially reduce the REMF voltage. At sufficiently small values of REMF voltage, for example, the associated transient energy may be insufficient to excite substantial conducted or radiated noise. As such, shielding and/or filtering may be substantially reduced or eliminated in some systems.

In another aspect, some embodiments of the power stage 110 may include one or more semiconductor switch elements with high peak reverse voltage capability. Some embodiments may use high voltage devices to improve reliability in systems that switch inductive loads. In some embodiments, one or more of the switch elements may combine a high peak reverse voltage capability with very short turn-on and/or turn-off times. Examples of various switch elements that may be used in the power stage 110 are described in further detail with reference to FIG. 2.

In the depicted example, the controller 115 receives a control input. In various examples, the control input may couple the controller 115 to a feedback signal from one or more position, torque, speed, voltage, light intensity, or current sensors, or a combination of signals from these and/or other sensors. In some other examples, the control input may couple the controller 115 to one or more command inputs, which may be in the form of analog (e.g., potentiometer, relay contacts, and the like) and/or digital (e.g., serial, parallel) input signals.

In response to such feedback and/or command input signals, the controller 115 may adjust operation of the power stage 110, for example. In various examples, the responses to control input signals may include, but are not limited to, turning the output on or off, increasing or decreasing the average output voltage, maintaining the output current within predetermined limits, adjusting operating duty cycle and/or frequency, for example. In some implementations, such control actions may be used to, for example, maintain the output current or load temperature within predetermined limits, regulate a motor shall position and/or speed, or control a lamp output intensity.

Figure 6:
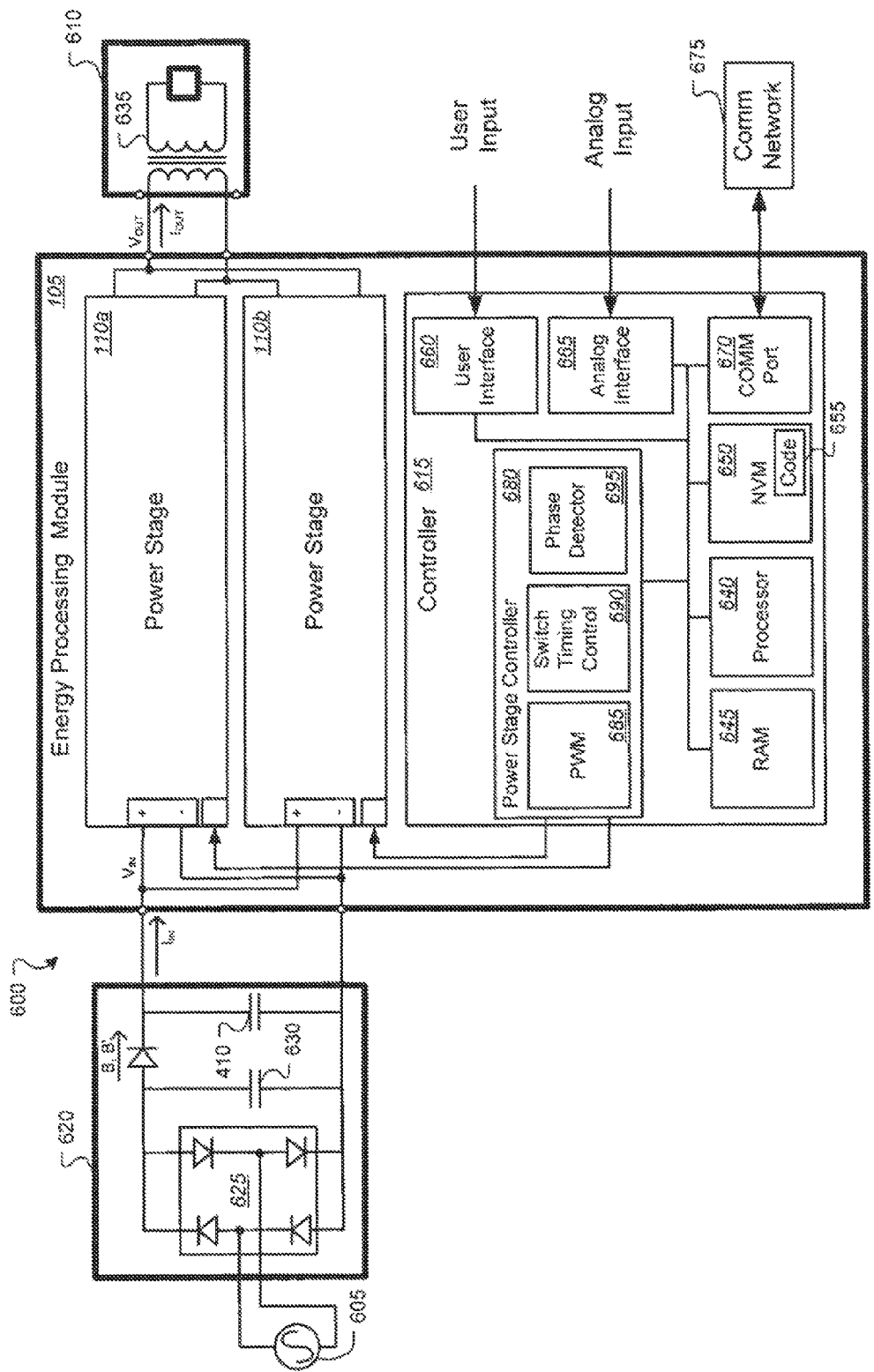
FIG. 6 shows a block diagram representation of an exemplary energy processing system that uses the power stages of FIG. 5 to supply energy from an AC input to an AC inductive load.

Exemplary embodiments and features of the controller 115 are described, for example, with reference to FIG. 6

In various examples, the energy stored in the load (e.g., reactive energy) may be supported by a unidirectional current supplied by the power stage 110. Unidirectional current loads may include, but are not limited to, DC motors, inductors (e.g., air core, iron core, laminated steel core, high permeability cores), electromagnets, lighting (e.g., direct current high intensity discharge elements), DC transmission lines, or combinations of these and/or other unidirectional current loads. Some embodiments may be used as, or as replacement for, mechanical relays or contactors. For example, the power stage 110 may act as an electronically controllable switch to a DC load, for example, that may be controlled by a switch, optical signal, magnetic signal, or electrical signal, which may be generated by, for example, a processor, timer, control circuit, or other element (e.g., bimetallic strip, level sensor, humidity sensor, or the like).

Some other embodiments may operate to supply energy to unidirectional current and/or bi-directional current loads that are substantially inductive, substantially resistive, or partially resistive and partially inductive. Bidirectional current loads may include, but are not limited to, AC motors (e.g., synchronous, brushless DC, induction), DC motors (e.g., forward and reverse torque), resistors (e.g., heating elements), inductors (e.g., air core, iron core, laminated steel core, high permeability cores), electromagnets, lighting (e.g., fluorescent, high intensity discharge), AC transmission lines, transformers, or combinations of these and/or other bi-directional current loads. Examples of energy processing modules that are capable of supplying unidirectional and/or bidirectional current loads are described in further detail with reference, for example, to FIGS. 5-7.

Figure 2:
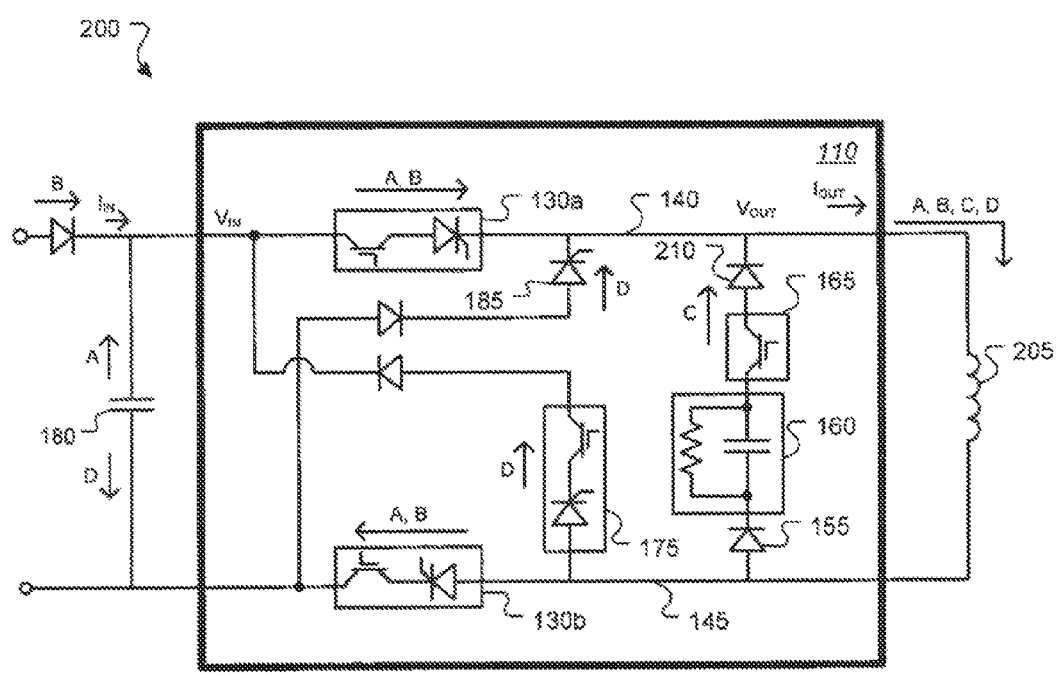
FIG. 2 shows a schematic representation of an exemplary power stage to supply energy from a DC input to a DC inductive load.

FIG. 2 shows a schematic representation of an exemplary power stage to supply energy from a DC input to a DC inductive load. In the depicted embodiment, the unidirectional current element 185 is implemented with an SCR that may be controlled to conduct current during time period D.

In the depicted example, the switches 130a, 130b, 175 are implemented with a gated unidirectional current element connected in series with a controlled semiconductor switch. In some embodiments, each switch may be controlled to provide zero current turn on for the controlled semiconductor switch (e.g., IGBT) and/or controlled turn-off for the gated unidirectional current element (e.g., SCR). In an illustrative example, which is not meant to be limiting, any of the switches 130a, 130b, 175 may be turned on by supplying an enabling signal to a control terminal (e.g., gate, base) of the controlled semiconductor switch; after the controlled semiconductor switch has had sufficient time to substantially transition to a substantially high conductance state, a fast turn-on time gated unidirectional current element may be controlled to turn on. The relative timing of the enabling signal to the controlled semiconductor switch and to the gated unidirectional current element may depend, at least in part, on the turn-on transition times of the devices. In various embodiments, the enabling signals to the controlled semiconductor switch and to the gated unidirectional current element may be generated in response to one signal (e.g., substantially simultaneous), or the signals may be separated in time by a controlled delay (e.g., based on hardware or software timers, based on events as determined by a processor executing instructions, and/or analog delay circuit, or the like). In some embodiments, enabling signals from the controller 115 may be coupled to one or more of the devices, for example, via suitable gate supply circuits, some of which may include, but are not limited to, optical, magnetic (e.g., pulse transformer) circuits. In various embodiments, the gated unidirectional current switch may include, but is not limited to, an SCR (silicon controlled rectifier), DIAC, TRIAC, flash tube, or the like. In various embodiments, the semiconductor switch may include one or more series and/or parallel combinations of IGBTs (insulated gate bipolar transistors), MOSFETs (metal oxide semiconductor field effect transistors), BJTs (bipolar junction transistors), Darlington pairs, JFETs (junction field effect transistors), vacuum tubes, or the like.

Typical switching transition times may be, for example, between about 2 and about 10 microseconds, although embodiments may be used with substantially faster or slower switching times. In an illustrative example, the time for the switches 130a, 130b to turn completely off and the switch 175 to turn on may typically take about 5 microseconds. In some examples, the transitional switch 165 may conduct current during at least those 5 microseconds. In some embodiments, the voltage limiter 160 may substantially conduct the load current in response to the REMF voltage in, for example, 10 to 40 nanoseconds.

Also depicted in FIG. 2 is an exemplary embodiment of the voltage limiter 160, including a parallel resistor and capacitor network. In various implementations, the capacitor may be implemented as one or more capacitors in series and/or parallel combinations. For example, capacitors of with a range of frequency response characteristics may be used to respond to the REMF voltage over a wide frequency range. In some embodiments, which may be used in higher switching frequency applications, the voltage limiter 160 may include a controlled switch to "dump" charge stored on a capacitor during the time period C. In this embodiment, the capacitor 180 is implemented across the input terminals of the module 110. In other embodiments, the capacitor 180 may be implemented in whole or in part within the module 180, and may be supplemented with additional external parallel capacitance to suit a wide variety of application conditions, for example.

In this embodiment, the transitional switch 165 is depicted as being implemented with a semiconductor switch. In various implementations, the transitional switch 165 may be implemented, for example, with one or more IGBTs, MOSFETs, BJTs Darlington pairs, JFETs, vacuum tubes, or the like. In addition, the power stage 110 of this embodiment includes a diode 210 connected between the transitional switch 165 and the output node 140. In some embodiments, the diode 210 may provide additional protection for the transitional switch 165, for example. In some examples, the diode 210 may replace the diode 155.

Figure 3:
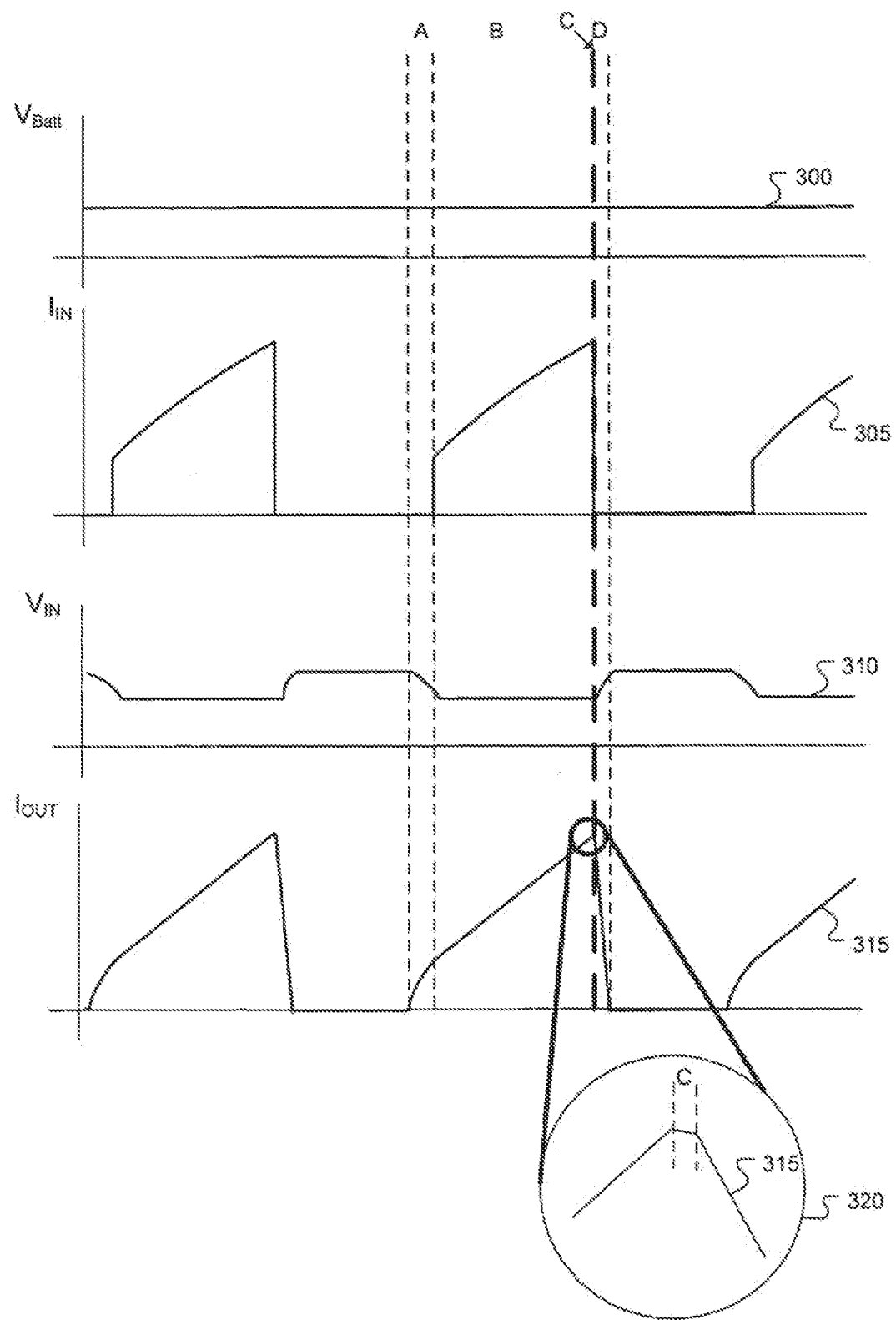
FIG. 3 shows plots of exemplary voltage and current waveforms to illustrate operation of the power stages of FIGS. 1-2.

FIG. 3 shows plots of exemplary voltage and current waveforms to illustrate operation of the power stages of FIGS. 1-2.

In this example, a plot 300 illustrates that the power source 120 provides a unipolar input voltage. In this case, the voltage may be that supplied by a battery. In other examples, the power source 120 may be any other suitable unipolar or DC source, such as a half- or full-wave rectified AC signal, for example. In some applications, the power source 120 may exhibit a voltage stiff characteristic, which may be provided, for example, by a substantially large hold-up capacitor. In some other applications, the power source may provide a rectified AC signal without a substantial hold-up capacitance. In such applications, the voltage of the unipolar power source 120 may drop to within one or two diode drops of the AC supply voltage, for example, during the time period B when the output current Iout is supplied substantially by the power source 120.

The plot 305 illustrates that the power source 120 supplies the input current Iin to the load during the time period B (e.g., Iin=Iout), and not during any other time period of the exemplary operating cycle.

The plot 310 illustrates that Vin at the input node 135 is elevated at the beginning of the time period A, which reflects the charge on the capacitor 180. The plot 315 of the output current Iout illustrates that the discharge of the capacitor 180 during the time period A supplies real energy to the load, which may advantageously reduce the power drawn from the power source 120 during the operating cycle.

The plots 310, 315 also show the charging of the capacitor 180 and a controlled decrease in output current Iout in the time period D. The controlled decrease of Iout may advantageously control an amplitude of the REMF.

The plot 320 illustrates, in a magnified view, a portion of the output current Iout waveform around the time period C in the plot 315. In some examples, the time period C is short relative to the time periods A, B, and D. During the time period C in this example, the slope (e.g., dIout/dt) of the plot 315 is controlled substantially by operation of the voltage limiter 160. In some embodiments, the slope may be controlled sufficiently well such that the amplitude and noise energy associated with the REMF voltage signal may be substantially reduced.

In some applications, successive operating cycles may occur without interruption for an indefinite period during which energy may be supplied to the load. For example, operating cycles may have a substantially fixed period, which may include, but is not limited to, periods of between about 10 and about 20 milliseconds, or between about 1 and about 30 milliseconds, or between about 50 and about 1000 microseconds, or less than 60 microseconds, for example. In some applications, one or more finite number of successive periods may be interrupted by variable times of not supplying power to a load. In some embodiments, the duration of an operating cycle may be varied according to load requirements, an input command, or other requirements (e.g., to avoid an audible resonance frequency, filtering requirements, synchronization to a utility supplied voltage).

Figure 4:
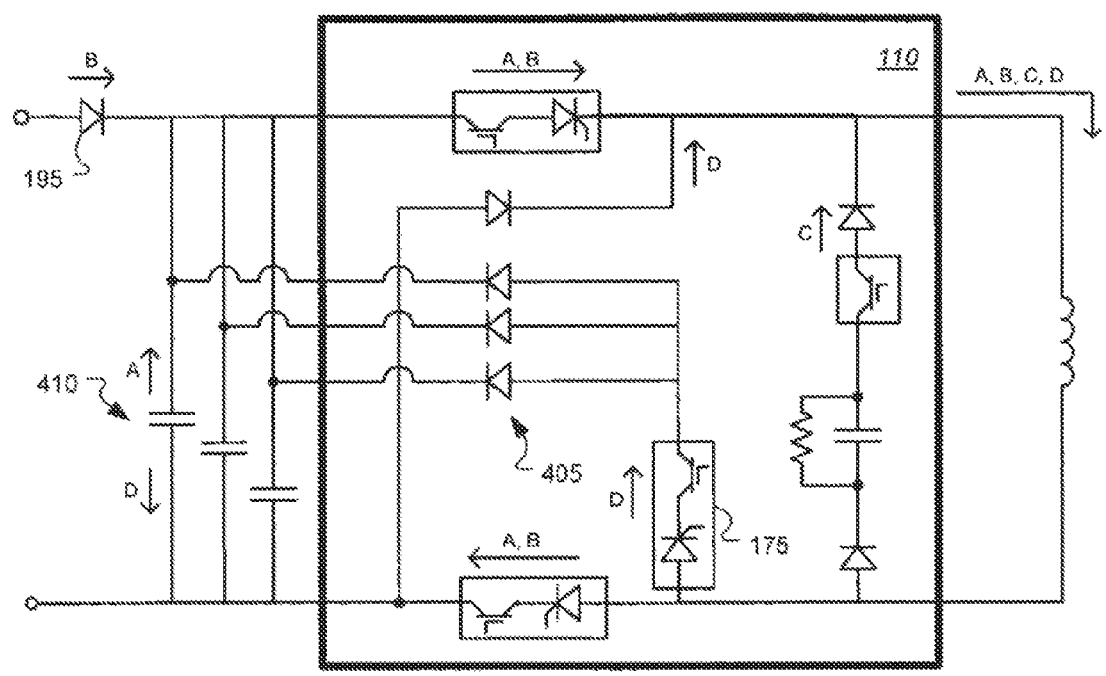
FIG. 4 shows a schematic representation of an exemplary power stage to supply energy from a DC input to a DC inductive load.

FIG. 4 shows a schematic representation of an exemplary power stage 110 to supply energy from a DC input to a DC inductive load.

In the depicted embodiment, the power stage 110 has an array of diodes 405, each of which is connected from the switch 175 to a capacitor in an array of parallel-connected capacitors forming a capacitance 410. In various implementations, the module or systems may incorporate some or all of the capacitance 410, which may include an array of parallel capacitors to implement the capacitor 180. In some embodiments, one or more of the individual capacitors may each have a different frequency response characteristic (e.g., inductance) such that the array of capacitors 410 may effectively capture energy from the inductive load over a wide range of frequency components, for example, in the REMF voltage signal.

Also depicted in this embodiment is a diode array 405 connected between the energy capture switch 175 and one of the capacitors in the array of capacitors 180. The parallel diodes 405 may, in some embodiments, advantageously reduce ringing and/or oscillations among the capacitors in the capacitance 410. The capacitor 410 may be implemented using two or more parallel capacitances that may provide wider response bandwidth (e.g., low inductance paths) and/or increased capacitance. Optionally, the array of diodes may be implemented as a single diode (e.g., diode 190b of FIG. 1). In some implementations (not shown), a controllable device such as an SCR may optionally be included in the path carrying current during time period D, an example of which is described with reference to the element 185 in the FIG. 2. Such an SCR may advantageously increase peak voltage withstand capability, and/or reduce undesired (e.g., inter-electrode, parasitic) capacitance, for example.

Figure 5:
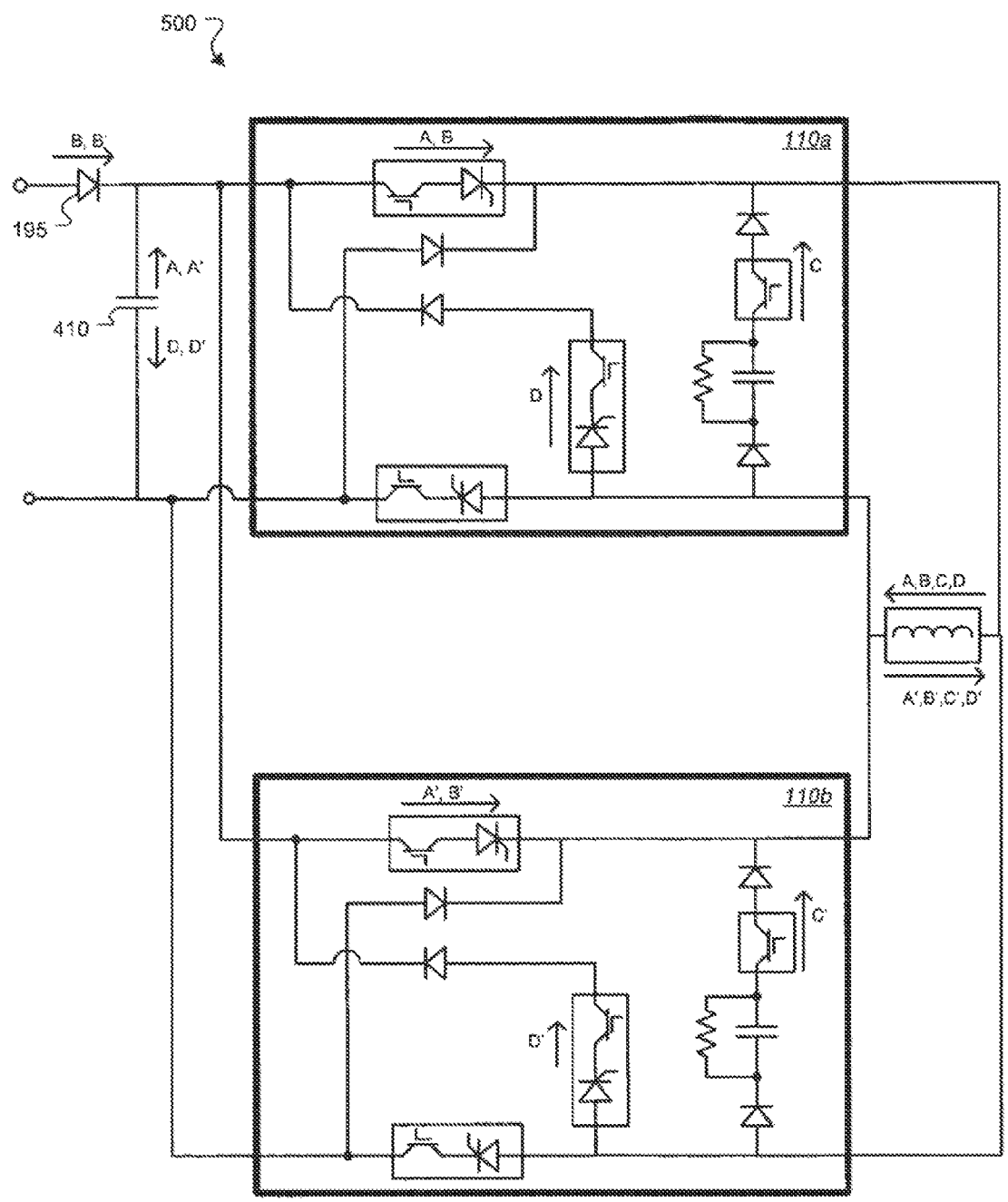
FIG. 5 shows a schematic representation of an exemplary pair of power stages to supply energy from a DC input to an AC inductive load.

FIG. 5 shows a schematic representation of an exemplary pair of power stages 110a, 110b to supply energy from a DC input to an AC inductive load. In this embodiment, the power stages 110a, 110b are substantially similar in that they have substantially the same circuitry and draw power from the same power source (e.g., through the diode 195). They differ primarily in the timing of their output signals. In various embodiments, the power stages 110a, 110b may alternately supply output current to the load. In particular, the power stage 110a may supply unidirectional output current A, B, C, D in a first direction to the load, and the power stage 110b may supply unidirectional output current A', B', C', D' in a second direction to the load. In some implementations, the capacitor 410 may be implemented using two or more parallel capacitances that may provide wider response bandwidth (e.g., low inductance paths) and/or increased capacitance, as described in embodiments with reference to FIG. 4, for example.

In an illustrative embodiment, a controller (not shown) may generate control signals to perform an operating cycle using power stage 110a. During power stage 110a's operating cycle, the controller may turn off all of the switches in the power stage 110b, thereby preventing any output current from the stage 110a from flowing in the stage 110b. Similarly, the controller may disable the stage 110a when the power stage 110b performs its operating cycle.

FIG. 6 shows a block diagram representation of an exemplary energy processing system that can use the power stages of FIG. 5 to supply energy from an AC input to an AC inductive load. The system 600 receives AC power input from an AC power source 605, and supplies an AC power output to operate an AC load 610.

In the depicted example, the energy processing module 105 includes two power stages 110a, 110b, and a controller 615. Using the controller 615, the energy processing module 105 may provide automatic and intelligent control to the power stages 110a, 110b to improve efficiency and/or control a power factor of the AC power input. For example, the energy processing module 105 may control REMF of the load and capture and re-use inductive load energy to provide high energy efficiency. Additionally, the energy processing module 105 may be digitally controlled. In some examples, the controller 615 may be programmed to control the power stages 110a, 110b according to various inputs (e.g., user inputs, analog inputs, and/or communication network input). For example, the controller 615 may also include software and hardware to control the switches in the power stages 110a, 110b based on user input and/or in response to specified events (e.g., AC brownout conditions, load fault conditions, time of day events, or the like).

The system 600 also includes an input stage 620. The energy processing module 105 receives the AC power input from the AC power source 605 via the input stage 620 and supplies the AC power output to the load. In some implementations, the AC power source 605 may supply power from an electrical power distribution network (e.g., utility power at about 50-60 Hz, or marine/aviation power at about 400 Hz). The input stage 620 may precondition an input voltage, for example, by smoothing and/or rectifying input power for the energy processing module 105.

As shown, the input stage 620 includes a diode bridge rectifier 625 and a capacitor 630 to filter the DC power output. In some implementations, the capacitor 630 may reduce the variation in the DC output voltage waveform from the bridge. In some examples, the capacitor 630 may be tuned for wave shaping to improve power efficiency of the energy processing module 105. In various embodiments, the capacitor 630 may be sized to effectively provide input current wave shaping that substantially reduces crest factor by reducing current peaks and associated AC current harmonics.

In some implementations, the capacitor 630 may raise the DC average voltage to supply the energy processing module 105. In some examples, the higher DC voltage may be used to start the load 610 and improve various types of inductive device performance. In some examples, the increase in DC voltage levels may also be used to overdrive line losses to maintain inductive device performance.

Using the energy processing module 105, the AC power source 605 may supply unidirectional and/or bidirectional current to a load, such as the load 610. The load 610 may include a single device (e.g., motor) or multiple devices (e.g., a bank of lights).

In the depicted example, the load 610 includes a transformer 635 that receives the bidirectional (e.g., AC) power output from the energy processing module 105. In one implementation, the transformer 635 may transform the AC power output voltage from the energy processing module 105 to a load voltage (e.g., 200 V-500 V) that is used by the load 610. For example, the transformer 635 may step-up a low output voltage (e.g., 100 V-220 V) to a higher voltage (e.g., 480 V) for the load 610.

The energy processing module 105 may provide improved power efficiency and/or control over the input power factor. For example, the energy processing module 105 may provide line frequency power factor correction to improve a power factor drawn from the AC power source 605. In some implementations, the system 600 may provide line frequency switching (LFS) operations at any in a range of frequencies. In some examples, the LFS process may be timed and synchronized with a phase of the AC power source 605 to produce, for example, 50 Hz or 60 Hz, switched voltages and current waveforms for a wide spectrum of inductive loads (e.g., the load 610).

In some examples, the controller 615 may use the LFS process to raise the electrical efficiency and controllability of standard 50 Hz and 60 Hz inductive devices, such as the transformer 635, lamp ballasts, AC induction motors, DC motors, and power supplies. In some examples, the LFS process may be used in high-power applications and high-power control. For example, very large inductors operating at high power levels may be operated with improved stability and energy efficiency. In some examples, the controller 615 may use the LFS process to provide capabilities that include, but are not limited to, power factor (PF) correction, power level control, high-speed shutdown protection, soft-start and/or hard-start, and universal input (e.g., AC and/or DC). Exemplary applications may include, but are not limited to line frequency inductive devices such as metal halide and fluorescent lighting, AC induction motors, and welders, for example.

In one example application, a small amount of filter capacitance (e.g., to provide AC current wave shaping and improved crest factor) may be combined with LFS timing to substantially equalize input power among all four quadrants. In such an example, the energy processing module 105 may generate the AC power output with a high PF.

In some embodiments, the controller 615 may operate to adjust phase and duty cycle to maximize achievable power factor when supplying any output power level to the inductive device. For example, a PF of better than 0.9 may be accomplished down to about 50% output power levels in some applications. If a higher PF is required below 50% output power levels, some embodiments may include an AC line reactor at the AC power source 605 to raises PF back to acceptable levels.

The controller 615 in the energy processing module 105 may provide certain control functions to adjust PF in the system 600 and to, for example, reduce REMF, improve energy efficiency, and/or execute software instructions. The controller 615 includes a processor 640 (e.g., a CPU) and a random access memory (RAM) 645 to provide various digital control functions. The controller 615 also includes a non-volatile memory (NVM) 645 to store software and data. In the depicted example, the NVM 645 stores a code 655. The processor 640 may execute the code 655 to perform various digital control functions in the energy processing module 105.

In the depicted example, the controller 615 may receives external input via a user interface 660, an analog interface 665, and/or a communication port 670.

From the user interface 660, the controller 615 may receive user input. The user interface 660 may be, for example, a set of dip switches for setting an operating mode of the energy processing module 105. For example, a user may use the user interface 660 to set the output voltage of the energy processing module 105 to be 110 V for operation in the U.S. or 220 V for operation in Europe. In another example, the user interface 660 may receive user input to dim or brighten intensity of a bank of fluorescent lights in a commercial building.

The controller 615 may receive analog input via the analog interface 665. The analog input may include signals generated from sensors. For example, the system 600 may include a Hall Effect sensor, voltage sensor, current sensor, position sensor, velocity sensor, a temperature sensor, a light sensor, AC line (e.g., 50-60 Hz) phase sensor, and/or other sensor to detect external environment parameters. In some implementations, the controller 615 may receive measurement signals from a Hall Effect sensor for proximity switching, positioning, speed detection, and current sensing applications. In some implementations, the controller 615 may receive measurement of an ambient temperature at from a temperature sensor to control power output. For example, the processor 640 may adjust to supply maximum output power to an air conditioning load when the ambient temperature is higher than a set point. In some implementations, the controller 615 may receive measurement of an external light intensity. For example, the processor 635 may control the power stages 110a, 100b to supply a decreased power output to dim the lights (e.g., when the sun is shining, during off hours, and the like).

The controller 615 communicates with a communication network 675 via the communication port 670. For example, the communication port 670 may transmit and receive data between the processor 640 and the communication network 675. The communication network 675 may include the Internet, a local area network (LAN), and/or a communication cable (e.g., a universal serial bus (USB) cable, a Firewire, other parallel or serial data bus) for communicating with a computer device. The connection between the controller 615 and the communication network 675 may also be wireless. For example, the communication network 675 may be connected to the controller 615 using wireless LAN, infrared, Bluetooth, mobile communication network or other wireless network connections.

In some implementations, the controller 615 may receive remote data or instructions from the communication network 675. In some examples, the controller 615 may receive messages that are remotely generated and transmitted to the controller 615 through the communication port 670. For example, an operator may remotely adjust power output by transmitting an instruction to the controller 615 from a remote terminal via a communication network, such as the Internet.

In some implementations, the controller 615 may transmit status and/or other data to the communication network 675. In some examples, there may be an administrative processor that is connected to the communication network 675 to monitor operating conditions of the system 600. For example, the controller 615 may transmit, via the communication port 670, status information indicating the operating conditions of the system 600.

En some implementations, the controller 615 may receive software updates from the communication network 675. For example, the code 655 or operation settings stored in the NVM 650 may be updated by data received from the communication network 675 via the communication port 670.

The code 655 may include operations that may be performed generally by the processor 640. The operations may be performed under the control, supervision, and/or monitoring of the controller 615. Operations may also be supplemented or augmented by other processing and/or control elements that may be incorporated by the interfaces 660, 665, 670. Some or all of the operations may be performed by one or more processors executing instructions tangibly embodied in a signal. The processing may be implemented using analog and/or digital hardware or techniques, either alone or in cooperation with one or more processors executing instructions.

In some implementations, the processor 640 may execute the code 655 to route the input power based on conditions at the AC power source 605 and the load 610. For example, the AC power source 605 may be a wind-power generator. When the load 610 is turned off and the wind-power generator is generating power, the code 650 may include operations to save the generated energy in a storage element (e.g., a battery).

In the depicted example, the controller 615 includes a power stage controller 680 to control switches in the power stages 110a, 110b. By controlling the power stage controller 680, the processor 640 may control the switches in the power stages 110a, 110b. The power stage controller 680 includes a PWM (pulse width modulator) 685, a switch timing control 690, and a phase detector 695. In one example, the phase detector 695 may provide phase information about the input AC source, and the PWM 685 may generate a duty cycle command to determine a required on time for the input switches that connect the power source to the load. The switch timing control 690 may use the duty cycle and phase information to generate control signals for the input switches. The control signals may be timed to draw a current waveform with a fundamental frequency substantially in phase with the AC source voltage. The output of the power stage controller 680 may control, for example, at least the fundamental frequency of the output current waveform.

Figure 7:
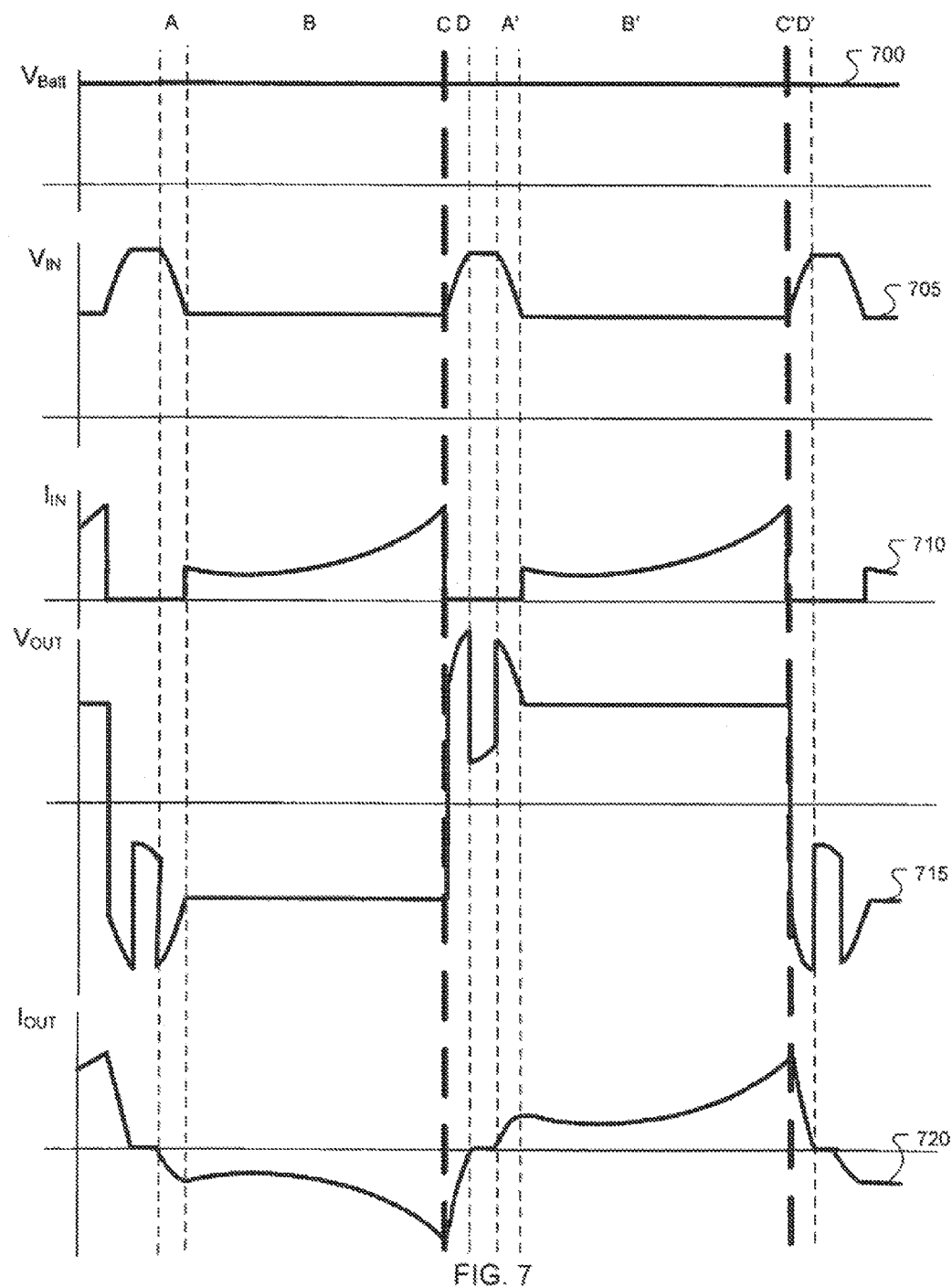
FIG. 7 shows plots of exemplary voltage and current waveforms to illustrate operation of the power stages of FIGS. 5-6.

FIG. 7 shows plots of exemplary voltage and current waveforms to illustrate operation of the power stages of FIGS. 5-6. The plots 700, 705, 710, 715, and 720 of FIG. 7 illustrate similar aspects of an operating cycle, respectively, to those illustrated in the plots 300, 305, 310, and 315 of FIG. 3. However, the plots of FIG. 7 illustrate bi-directional current at the load, as described, for example, with reference to FIG. 5. In addition, the load in the depicted example is an AC motor. As such, the waveforms in the plots of FIG. 7 reflect a time-varying back-emf generated by The motor.

Although the output current Iout of the plot 720 is bidirectional and supplied to an AC motor, the energy processing module 105 provides for a controlled dIout/dt during time periods C, D, C' and D'. As such, the REMF voltage may be well controlled, providing various advantages as discussed above. Moreover, the energy captured during the time periods D, D' may be reused during subsequent time periods A, A', respectively.

Figure 8:
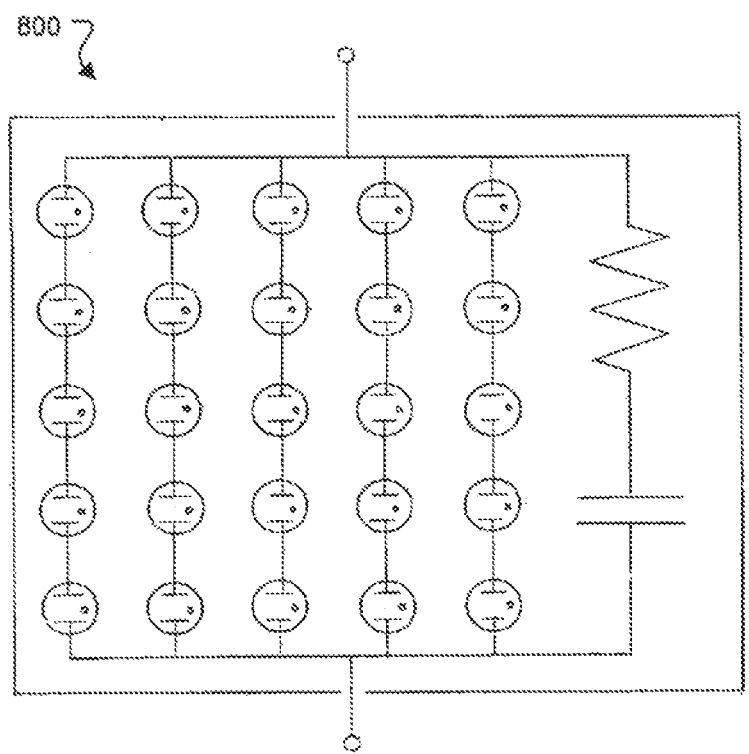
FIGS. 8-9 show exemplary voltage limiting circuits.
Figure 9:
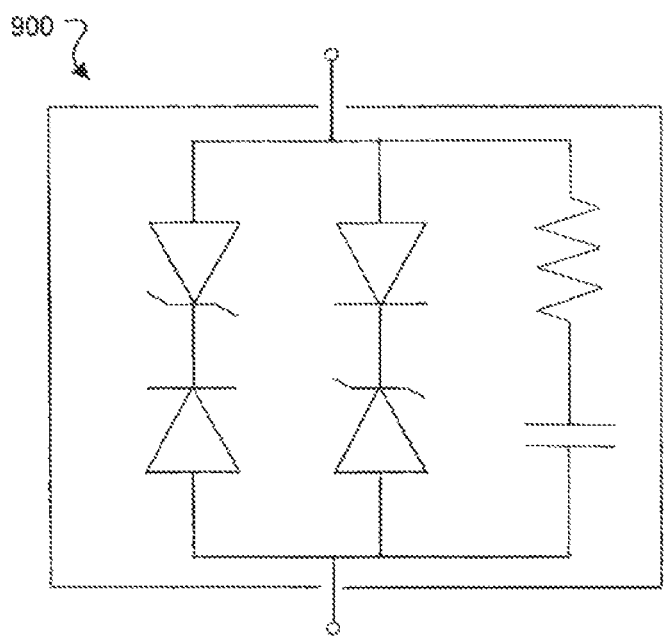

FIGS. 8-9 show exemplary voltage limiting circuits that may be used, for example, in the voltage limiter 160 of FIG. 1.

FIG. 8 shows an exemplary voltage limiter circuit 800 that includes five parallel strings, each string including five gas discharge tubes connected in series. The circuit 800 also includes a series-connected resistor and capacitor that is in parallel with the five parallel strings. One of skill in the art would recognized that the number of parallel and series connected components, as well as selection of the specific components, may be adapted to various voltage limiter applications.

FIG. 9 shows an exemplary voltage limiter circuit 900 that includes a pair strings, each string including a rectifier in series with zener diode, each string being connected in anti-parallel so as to substantially limit a voltage in either polarity across the circuit to a diode drop plus the zener breakdown voltage. The circuit 900 also includes a series-connected resistor and capacitor that is in parallel with the strings. One of skill in the art would recognized that the number of parallel and series connected components, as well as selection of the specific components, may be adapted to various voltage limiter applications. For example, the circuit 900 may be placed directly across an AC load.

Although various embodiments, which may be portable, have been described with reference to the above figures, other implementations may be deployed in other power processing applications, such as universal motor drives, DC transmission line stabilization, power factor correction, and numerous other applications.

Generally, components of a transient voltage limiter may be implemented and arranged to minimize inductance that may increase the response time.

In some embodiments, energy processing modules that are capable of supplying bidirectional current loads may also be operated to supply unidirectional current loads. For example, in the energy processing module 500 depicted in FIG. 5, either one of the power stages 505, 510 may be operated to supply unidirectional current to the load on successive operating cycles while the other power stage is held in an inactive state. As an illustrative example, if the load includes a DC motor driving a linear positioning system, then the power stages 505, 510 may be activated as needed by a position controller to drive the motor in either advance or reverse directions, respectively, to position an actuator. Such positioning systems may be used in industrial robotics, HVAC (heating ventilation air conditioning), and/or numerous other applications.

In some embodiments, the capacitance provided in the energy recovery stage may be adjustable during operation. One or more switches may be provided, for example, each of which may be individually operated to connect additional capacitance in parallel and/or in series with capacitance in the energy capture circuit. Adjustable capacitance may be used to adjust the time required to discharge load current to zero before the end of a cycle, for example. Capacitance selection switches may be arranged in parallel with a capacitance to short around the capacitance when turned-on, and/or in series with a capacitance to prevent current flow through the capacitance when the switch is turned off. Adjusting fall times of the load current may advantageously provide for adaptation to a wider range of operating conditions, such as load inductance and/or load current conditions, for example.

In embodiments that include more than one power stage coupled to drive a load, a controller may provide one or more interlock (e.g., AND gate) to prevent control signals from turning on switches in more than one power stage 110 at a time. In some implementations, an output current from each power stage may be monitored, and if a current is detected, all switches in a corresponding power stage may be disabled.

In various implementations, an energy processing module may be packaged in a module that contains one or more power stages and at least one controller. In addition to printed circuit board implementations, some embodiments may be provided in hybrid modules that may contain subcomponents or systems. For example, some implementations may include two power stage circuits adapted to provide an AC or two independent DC outputs, and a suitable controller in a potted module. Some modular implementations may have a DC input for connection to a unipolar power source, an AC input for connection to an AC power source (e.g., through an integrated rectifier module, such as the input stage 620 of FIG. 6), or a combination of one or more such inputs.

Extending the bi-directional output current capability embodiments described with reference to FIG. 6, for example, additional power stages may be configured to supply systems with three or more phases. For example, a three phase induction motor with stator windings arranged in a Delta configuration may be supplied by three pairs of power stages, each pair being configured as described with reference to FIGS. 5-6, for example, and each pair being coupled to supply one phase of the DELTA. Torque, current, speed, phase, position, or other parameters may be controlled, for example, by a controller supplying control signals to the controller 615, for example. In some embodiments, encoder, Hall Effect, back-emf sensing, or sensorless control, for example, may be used to implement vector oriented control techniques, such as variable frequency, constant volts per hertz, direct field orientation, or indirect field orientation, for example. In another example, power stages may be arranged and controlled to supply a three-phase system WYE-connected transformer, for example. In various multi-phase systems, the input to the power stage may be provided from a DC source and/or an AC source (e.g., single phase, multiple phase with half- or full-wave rectification for each phase).

In embodiments with outputs that provide AC (e.g., single phase, three phase, four phase, twelve phase, or the like) may be operated to output any fundamental frequency to the load, including frequencies up to at least about 100 kHz or more, such as about 5 Hz, 50 Hz, 60 Hz, 100 Hz, 400 Hz, 2 kHz, 5 kHz, 10 kHz, 20 kHz, 60 kHz, 90 kHz, or about 100 kHz. Further, phase of the output fundamental frequency and/or at least one harmonic frequency may be controlled, for example, to synchronize to a utility line voltage signal.

In some implementations with bidirectional or multiple phase capability, two or more power stages may share the same energy recovery capacitance. With reference to FIG. 7, energy captured in the capacitance during the time period D could be applied to the load in the subsequent time period A', and energy captured in the capacitance during the time period D' could be applied to the load in the subsequent time period A.

One or more power processing modules may be coupled to a network that may provide for control commands, software updates to be communicated to modules, and/or to receive status information from modules. Particular modules may be assigned a network address, such as an IP (interne protocol) address. For example, each module in an installation may be assigned a unique network address or controlled through a gateway with an IP address.

Although particular features of an architecture have been described, other features may be incorporated to improve performance. For example, caching (e.g., L1, L2, etc. . . . ) techniques may be used. Random access memory may be included, for example, to provide scratch pad memory and or to load executable code or parameter information stored in the non-volatile memory for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades, etc. . . . ), and the like. One or more communication interfaces may be provided in support of data storage and related operations.

Some systems may perform electronic processing functions. For example, various implementations may include digital and/or analog circuitry, computer hardware, firmware, software, or combinations thereof. Apparatus can be implemented in a computer program product tangibly embodied in an information carrier, e.g., in a machine-readable storage device or in a propagated signal, for execution by a programmable processor; and, methods may be performed by a programmable processor executing a program of instructions to perform functions of the invention by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. Elements of a computer may include a processor for executing instructions and one or more memories for storing instructions and data. Generally, a computer will also include, or be operatively coupled to communicate with, one or more mass storage devices for storing data files; such devices may include, but are not limited to, magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

Some implementations may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. To provide for interaction with a user, some implementations may provide for a display device, such as a CRT (cathode ray tube) or LCD (liquid crystal display) monitor for displaying information to the user, a keyboard, and/or a pointing device, such as a mouse or a trackball, by which an operator can access and/or provide input to the computer.

Various implementations may communicate using suitable communication methods, equipment, and techniques. For example, the system may communicate with compatible devices (e.g., devices capable of transferring data to and/or from the system 100) using point-to-point communication in which a message is transported directly from the source to the receiver over a dedicated physical link (e.g., fiber optic link, point-to-point wiring, daisy chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11a/b/g, Wi-Fi, Ethernet, TCP/IP, IrDA, FDDI (fiber distributed data interface), token-ring networks, or multiplexing techniques based on frequency, time, and/or code division. Some implementations may optionally incorporate features such as error checking and correction (ECC) for data integrity, or security measures, such as encryption (e.g., WEP) and password protection.

A number of implementations of the invention have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Accordingly, other implementations are within the scope of the following claims.

What is claimed is:

1. An apparatus comprising:
a computer program product (CPP) tangibly embodied in a non-transitory computer readable medium and containing instructions that, when executed, cause a processor to perform operations to control energy transfer from an energy supply to a load, the operations comprising:
connect an input node to an output node to transfer energy from a source connected to the input node to a magnetic field that is associated with an output current flowing from the output node to a load, the connection being made during a portion of an operating cycle;
disconnect the input node from the output node during a remainder of the operating cycle;
control a reverse electromotive force (REMF) voltage associated with the magnetic field by providing a path for the output current to flow when the output node is disconnected from the input node, wherein controlling a REMF voltage comprises providing a path for the output current to flow through a voltage limiting circuit;
collect a portion of the energy stored in the magnetic field during the operating cycle in an energy storage element; and
supply the collected energy to the load in a subsequent operating cycle.

2. The apparatus of claim 1, wherein the operation to control a REMF voltage comprises providing a path for the output current to flow through a voltage limiting circuit.

3. The apparatus of claim 1, wherein the operation to collect a portion of the energy stored in the magnetic field during the operating cycle comprises an operation to provide a path for the output current to flow through a capacitance.

4. The apparatus of claim 3, wherein the operation to supply the collected energy to the load in a subsequent operating cycle comprises an operation to transfer the collected energy from the capacitance to a magnetic field that is associated with the output current flowing from the output node to the load.

5. The apparatus of claim 3, wherein the CPP further comprises an operation to adjust the capacitance to cause the output current to fall to substantially zero during the operating cycle.

6. The apparatus of claim 1, wherein the operation to collect a portion of the energy stored in the magnetic field during the operating cycle comprises an operation to cause the output current to fall to substantially zero during the operating cycle.

7. The apparatus of claim 1, wherein the output current flows in only one direction with respect to the output node.

8. The apparatus of claim 1, wherein the source comprises a unipolar voltage source.

9. The apparatus of claim 1, wherein a duration of each operating cycle is between about 10 and about 20 milliseconds.

10. The apparatus of claim 1, wherein a duration of each operating cycle is between about 1 and about 30 milliseconds.

11. The apparatus of claim 1, wherein a duration of each operating cycle is between about 50 and about 1000 microseconds.

12. The apparatus of claim 1, wherein a duration of each operating cycle is less than 60 microseconds.

13. The apparatus of claim 1, wherein the CPP further comprises an operation to modulate a capacitance of the energy storage element to discharge the load current to substantially zero before the subsequent operating cycle.

* * * * *